(12) United States Patent
Reusche et al.

(10) Patent No.: US 7,513,680 B2
(45) Date of Patent: Apr. 7, 2009

(54) MAGNETIC AGITATION SYSTEM FOR WATER RETENTION STRUCTURE

(75) Inventors: Thomas K. Reusche, Elburn, IL (US); Philip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 610 days.

(21) Appl. No.: 11/215,437

(22) Filed: Aug. 30, 2005

(65) Prior Publication Data

US 2007/0045194 A1  Mar. 1, 2007

(51) Int. Cl.
B01F 13/08 (2006.01)

(52) U.S. Cl. ....................................................... 366/273

(58) Field of Classification Search ................. 366/273, 366/274, 342, 343; 416/3; 435/302.1; 99/277.2
See application file for complete search history.

(56) References Cited

U.S. PATENT DOCUMENTS

| | | | |
|---|---|---|---|
| 2,272,582 A | 2/1942 | Poppe | |
| 2,877,051 A | 3/1959 | Cushman et al. | |
| 3,595,537 A * | 7/1971 | Kaelin | 261/91 |
| 3,836,130 A | 9/1974 | Earhart et al. | |
| 4,086,306 A | 4/1978 | Yoshinaga | |
| 4,166,086 A | 8/1979 | Wright | |
| 4,216,091 A | 8/1980 | Mineau | |
| 4,448,685 A | 5/1984 | Malina | |
| 4,465,377 A * | 8/1984 | de Bruyne | 366/273 |
| 4,681,711 A | 7/1987 | Eaton | |
| 4,748,808 A | 6/1988 | Hill | |
| 4,993,841 A * | 2/1991 | Lofgren et al. | 366/274 |
| 5,336,399 A | 8/1994 | Kajisono | |
| 5,356,569 A | 10/1994 | Von Berg | |
| 5,393,142 A * | 2/1995 | Meier | 366/274 |
| 5,407,272 A * | 4/1995 | Meier | 366/274 |
| 5,478,149 A * | 12/1995 | Quigg | 366/273 |
| 5,807,151 A | 9/1998 | Sumino | |
| 5,980,100 A | 11/1999 | Haegeman | |
| 6,241,221 B1 * | 6/2001 | Wegner et al. | 261/93 |
| D457,595 S | 5/2002 | Ellsworth et al. | |
| 6,543,928 B2 * | 4/2003 | Beebe | 366/144 |
| 2007/0045194 A1 * | 3/2007 | Reusche et al. | 210/695 |

FOREIGN PATENT DOCUMENTS

JP       07031862 A  *  2/1995

* cited by examiner

*Primary Examiner*—Charles E Cooley
(74) *Attorney, Agent, or Firm*—McAndrews, Held & Malloy, Ltd.

(57) ABSTRACT

A water agitation system is configured to be positioned within a water retention structure. The system includes a main body positionable within a water retention area of the water retention structure, a magnet assembly housed within the main body, and an agitation ring loosely mounted over a portion of the main body. The agitation ring is magnetically attracted to, or repelled by, the magnet assembly so that a movement of the magnet assembly causes a corresponding movement of the agitation ring in order to circulate water retained within the water retention structure.

23 Claims, 7 Drawing Sheets

MAGNETIC AGITATION SYSTEM FOR WATER RETENTION STRUCTURE

BACKGROUND OF THE INVENTION

The present invention generally relates to water retention structures, such as bird bath basins, livestock water tanks/troughs, swimming pools, small ponds, fish tanks, and the like, and more specifically to a water agitator for placement in a water retention structure, to agitate water contained in the water retention structure.

Various water retention structures exist for a variety of purposes. For example, bird baths retain water for birds to bathe and frolic; swimming pools retain water for recreational purposes; backyard ponds retain water for aesthetic purposes (such as a habitat for small fish); livestock water tanks/troughs hold water for livestock to drink; water towers store water for various uses; and so on.

Bird baths are popular for attracting birds to residential homes, for example, and they may promote an interest in, and the well-being of, birds. An exemplary bird bath is described in U.S. Pat. No. 6,484,666, issued Nov. 26, 2002 to Thomas K Reusche, and assigned to Allied Precision Industries, Inc., which is hereby incorporated by reference in its entirety.

FIG. 1 illustrates an isometric view of a bird bath 100. The bird bath 100 includes a base 102 that supports a column 104, which in turn supports a basin 106. The basin 106 is configured to receive and retain water.

It is known to provide pumps for imparting motion to the water in the bird bath basin. Movement of the water tends to attract birds to the bath. It also reduces the potential for the bird bath to serve as a haven for insects, e.g., mosquitoes, bacteria, germs, and the like. Water movement, or circulation, within the bird bath is particularly important given the recent rise of West Nile virus within the United States. However, pumps typically require access to an electrical outlet and are therefore not suitable when an electrical outlet is not readily available. Additionally, existing birdbaths cannot be easily retrofitted with such pumps.

Stagnant water in water retention structures typically increases the rate of breeding of insects, bacteria, germs, and the like. Further, stagnant, stale water is typically undesirable for a host of additional reasons. For example, the taste, odor and physical appearance of stagnant, stale water may be objectionable.

Thus, a need exists for an apparatus for imparting motion to water retained within water retaining structures, such as bird baths and livestock water tanks/troughs.

BRIEF SUMMARY OF THE INVENTION

Embodiments of the present invention provide a water agitation system configured to be positioned within a water retention structure that retains water. The water retention structure may be a bird bath, livestock water tank/trough, pond, swimming pool, water tower, or various other structures that are configured to receive and retain water.

According to one embodiment, the system includes a main body positionable within a water retention area of the water retention structure. The main body may include an upright tube integrally formed with a base that is adapted to be supported by the water retention structure. A magnet assembly and motor are housed within the upright tube, such that the magnet assembly is operatively connected to the motor so that said motor actuates the magnet assembly. The motor may be a servo motor that is configured to rotate the magnet assembly about a longitudinal axis of the magnet assembly, and to actuate the magnet assembly in a longitudinal direction of said main body.

A buoyant agitation ring is loosely mounted around a portion of the upright tube.

That is, the buoyant agitation ring is mounted around a portion of the upright tube such that it may freely rotate about a longitudinal axis of the tube and also move in a longitudinal direction over the surface of the upright tube (e.g., freely side up and down the upright tube). The agitation ring includes at least one metal member, such as a metal foil member, that is either magnetically attracted to, or repelled by, the magnet assembly. As a result, the ring is magnetically coupled to the magnet assembly such that movement (e.g., rotation) of the magnet assembly imparts responsive movement (e.g., rotation) of the agitation ring within the water retention structure. The agitation ring may include at least one blade extending outwardly therefrom, wherein each blade is configured to impart motion to water retained within the water retention structure.

Figure 1:
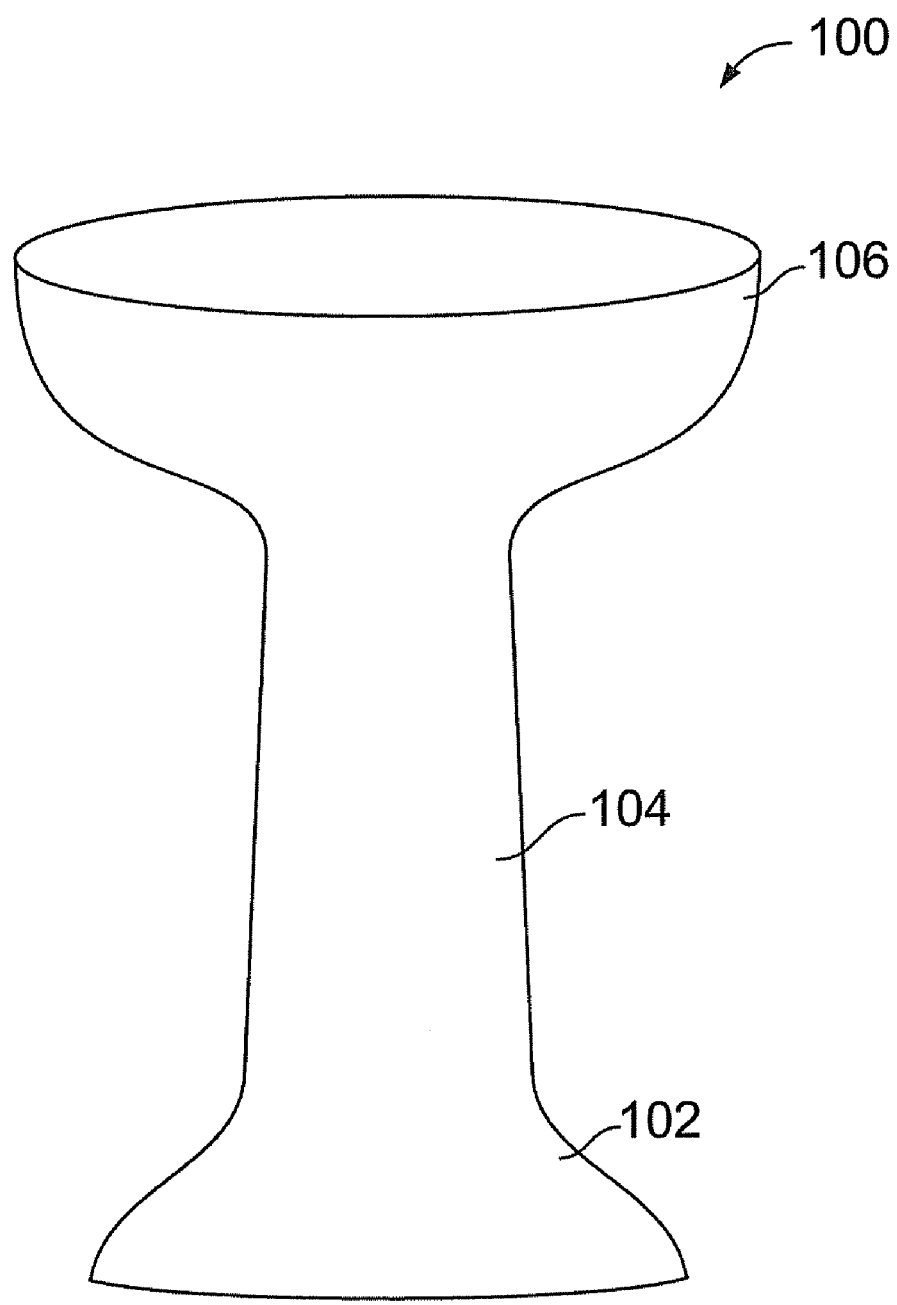
FIG. 1 illustrates an isometric view of a bird bath.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

Figure 2:
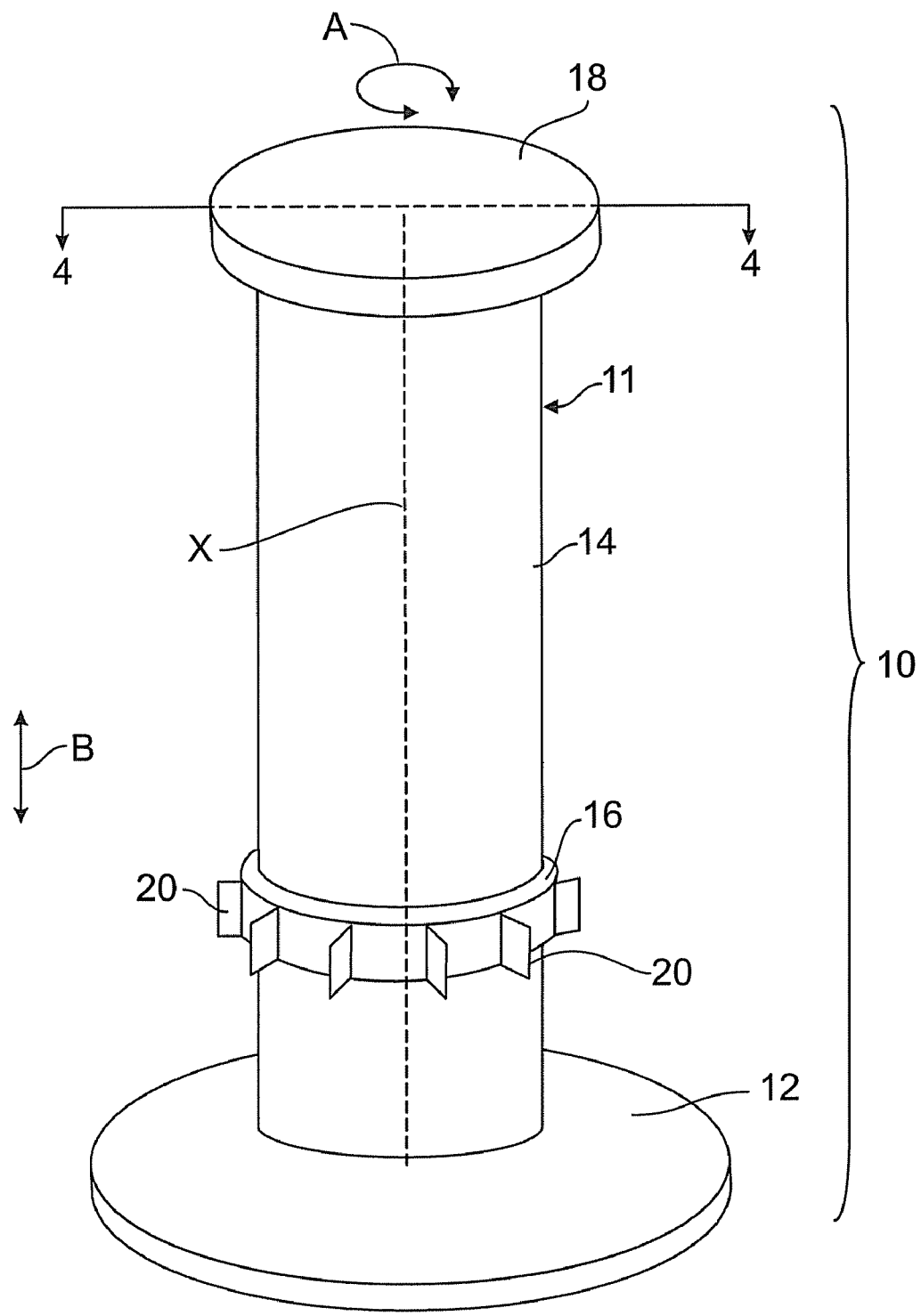
FIG. 2 illustrates an isometric view of a water agitation system according to an embodiment of the present invention.
Figure 3:
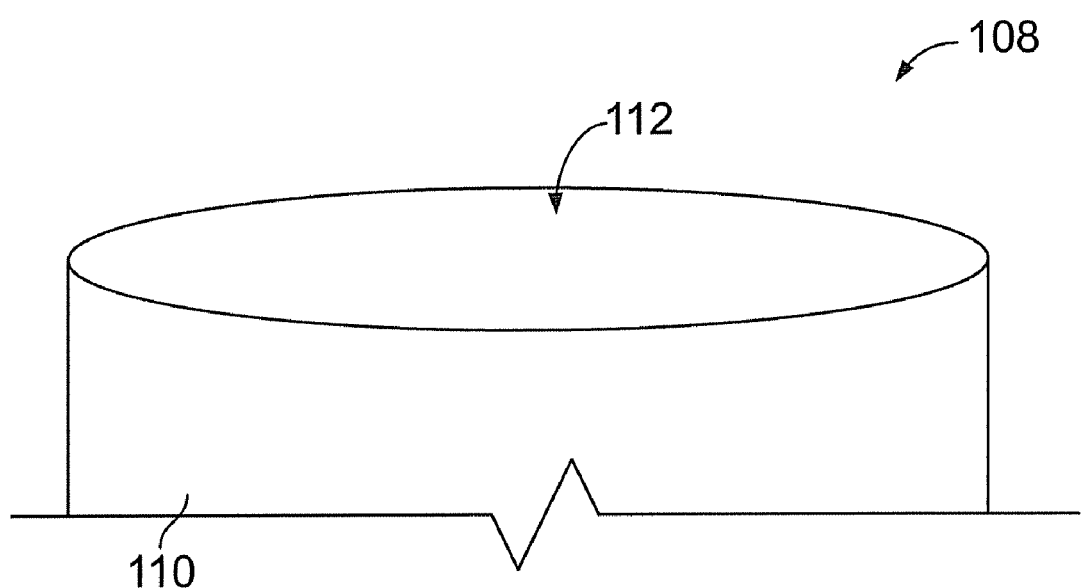
FIG. 3 illustrates an isometric view of a water retention structure.

FIG. 2 illustrates an isometric view of a water agitation system 10 according to an embodiment of the present invention. The water agitation system 10 is sized and constructed for placement in a water retention structure 108 (See FIG. 3) for imparting motion to water contained in the structure 108. The water retention structure 108 includes a main body 110 defined by outer walls, which in turn define an interior cavity 112. The interior cavity 112 is configured to receive and retain water. The water retention structure 108 may also include a series of pumps, pipes, and the like (not shown) in order to allow the passage of water into and out of the interior cavity 112. The water retention system 108 may be formed in various shapes and sizes and may have an open top (such as a basin of a bird bath), or may be completely enclosed (such as a water tower). For example, the water retention structure 108 may be a basin of a bird bath (such as the bird bath 100 shown in FIG. 1, a swimming pool, a livestock water trough, a backyard pond, etc.

Referring again to FIG. 2, the water agitation system 10 includes a main body 11 having a base 12 and an upright tube 14. The base 12 and tube 14 may be integrally formed (e.g., integrally molded). Alternatively, the base 12 and the tube 14 can be formed separately and configured to mate, e.g., through a snap fit, with one another. An agitation ring 16 is positioned over, and is coaxially aligned with, the tube 14. The agitation ring 16 fits loosely over the tube 14 so that the agitation ring 16 may freely rotate relative to a longitudinal axis X of the tube 14 in the directions denoted by A. Additionally, the agitation ring 16 is free to move (e.g., slide) in a longitudinal direction with respect to the tube 14 in the directions denoted by line B. The motion of the agitation ring 16 in the directions denoted by B is limited by the base 12 and the end cap 18, which is distally located from the base 12. As shown in FIG. 2, the agitation ring 16 includes a plurality of blades 20 that extend outwardly from the agitation ring 16. The blades 20 may be flat or curved. Additionally, the blades 20 may be smaller or larger than shown in FIG. 2. The agitation ring 16 may be formed of a buoyant material, such as polypropylene, styrofoam, rubber, or the like, such that the agitation ring 16 floats on water and at least a portion of the blades 20 extend into the water.

Figure 4:
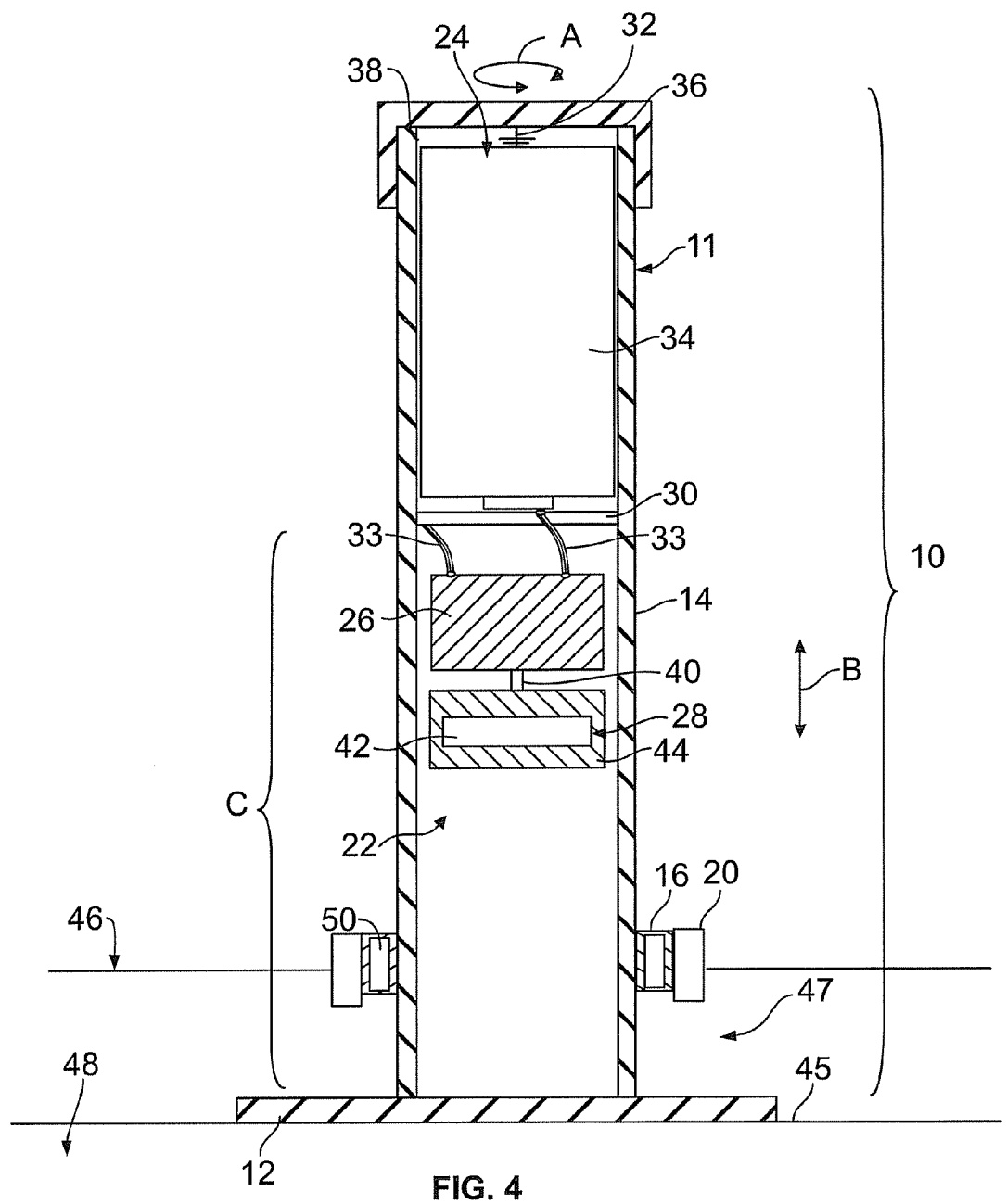
FIG. 4 illustrates a cross sectional view of a water agitation system along line 4-4 of FIG. 2.

FIG. 4 illustrates a cross sectional view of the water agitation system along line 4-4 of FIG. 2. The tube 14 of the main body 11 includes a sealed interior chamber 22, which houses a battery compartment 24, a motor 26, and a magnet assembly 28. The battery compartment includes positive and negative terminals 30, 32 that provide an electrical connection between a battery 34 and the motor 26 through wires 33. The positive connection terminal 30 may be a conductive plate, whereas the negative terminal 32 may be a spring member that is positioned on an underside 36 of the end cap 18, which may snapably, latchably, threadably, or otherwise removably engage a top end 38 of the tube 14.

The motor 26 is operatively conducted to the magnet assembly 28 through a drive shaft 40. The motor 26 acts to axially rotate the drive shaft 40 in the direction of A, which causes a corresponding rotation of the magnet assembly 28. The magnet assembly 28 includes a magnet 42 sandwiched, or interposed, within a plastic mounting disk 44. Optionally, the plastic mounting disk 44 may not be used, and the drive shaft 40 may be directly connected to the magnet 42. The rotation of the magnet assembly 28 causes a corresponding rotation in the agitation ring 16, which is magnetically attracted to, or repelled by, the magnet 42 within the magnet assembly 28.

As shown in FIG. 4, the base 12 of the water agitation system 10 is supported by a top surface 45 of a water retention area 47 of a water retention structure 48. The base 12 may rest upon the top surface 45, or it may be permanently fixed thereto. The agitation ring 16 floats on the surface of water 46 retained within the water retention area 45 of the water retention structure 48, which may be a bird bath basin, livestock water tank/trough, pond, swimming pool, or the like. The rotation of the agitation ring 16 imparts motion to the surrounding water 46. The blades 20 may extend into the water 46 in order to impart a greater degree of motion to the water 46.

The agitation ring 16 includes a metal foil ring, or insert, 50 positioned within the agitation ring 16. The insert 50 is magnetically attracted to, or repelled by, the magnet 42. As a result, the agitation ring 16 is magnetically coupled to the magnet assembly 28 such that rotation of the magnet 42 imparts a responsive movement of insert 50. The rotation of the insert 50, in turn, causes the agitation ring 16 to rotate, thereby imparting motion to the surrounding water 46.

Figure 5:
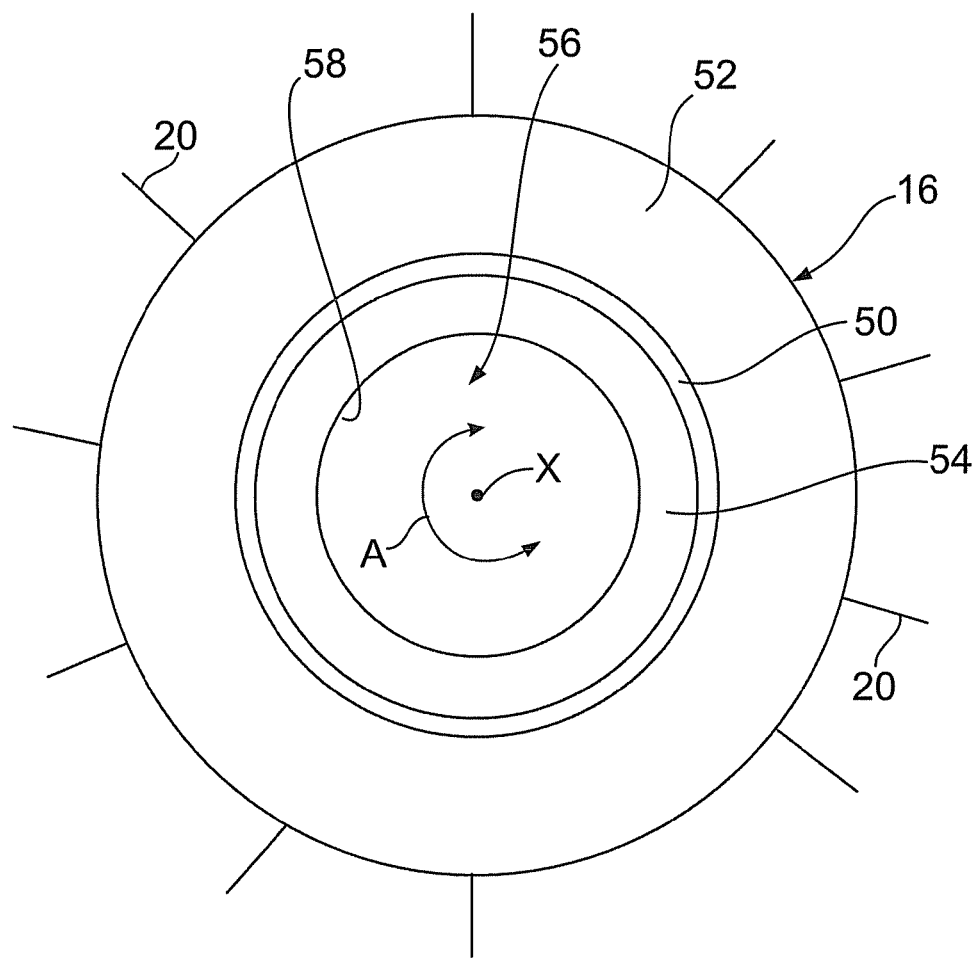
FIG. 5 is an axial cross sectional view of an agitation ring according to an embodiment of the present invention.

FIG. 5 is an axial cross sectional view of the agitation ring 16 according to an embodiment of the present invention. As shown in FIG. 5, the insert 50 is interposed within buoyant layers 52, 54 of the agitation ring 16. The agitation ring 16 includes a tube reception area 56 that is configured so that an interior wall 58 loosely engages an outer surface of the tube 14 (shown in FIG. 2 and 4), thereby allowing the agitation ring 16 to freely rotate relative to the axis X in the directions of A.

Figure 6:
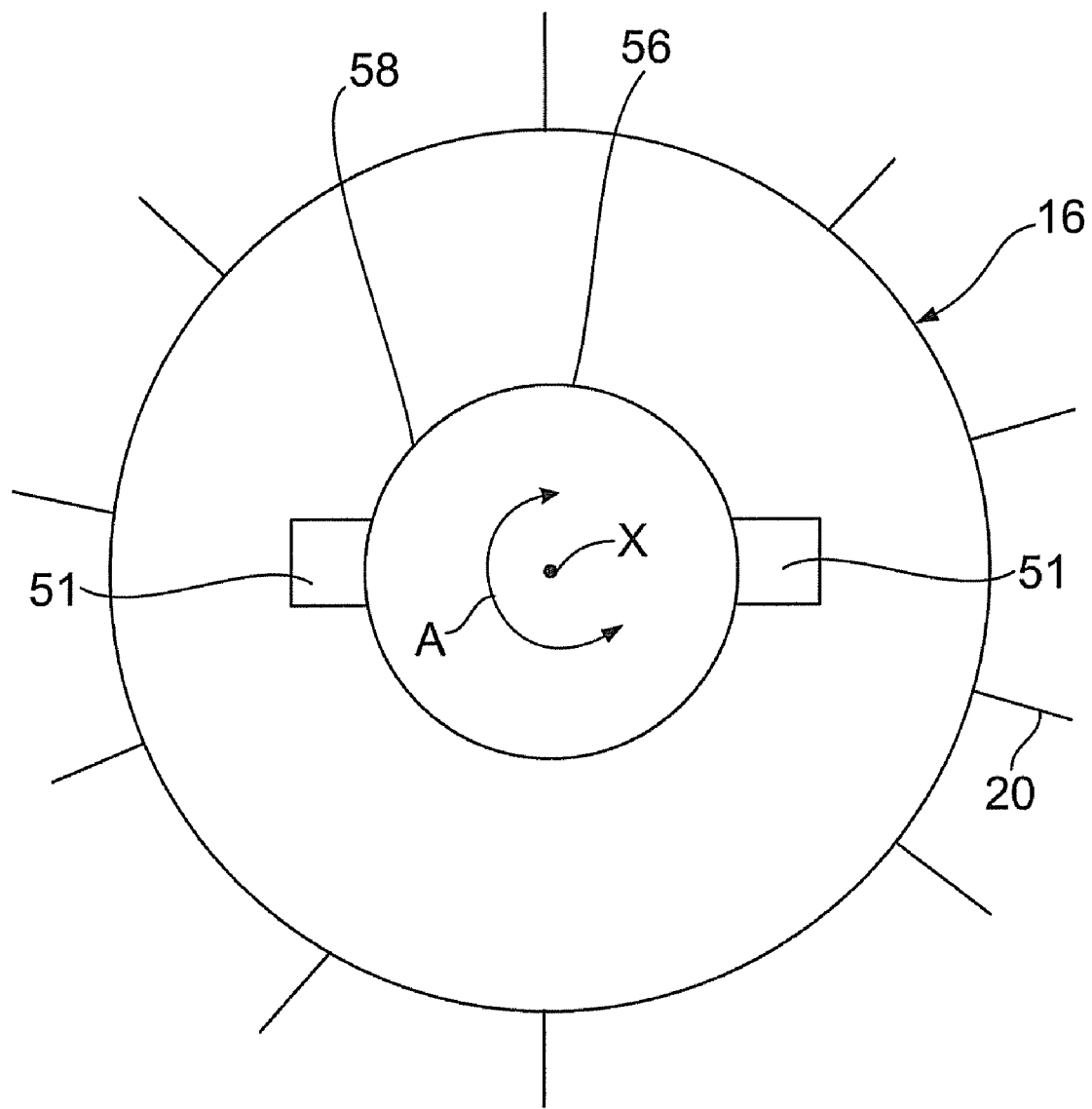
FIG. 6 is an axial cross sectional view of an agitation ring according to an alternative embodiment of the present invention.

FIG. 6 is an axial cross sectional view of the agitation ring 16 according to an alternative embodiment of the present invention. In this embodiment, the agitation ring 16 includes two metal foil members 51 positioned within the agitation ring 16. The metal foil members 51 may be attracted to, or repelled by, the magnet 42, thereby causing the agitation ring 16 to rotate in response thereto in the directions of A. As shown in FIG. 6, the metal foil members 51 are not formed as a ring such as the insert 50 shown in FIG. 5.

Referring again to FIG. 4, the operating range C of the agitation ring 16 is defined between the base 12 and negative terminal 30 (or the top of the motor 26). The magnet 42 is selected such that the agitation ring 16 floats on the water 46 despite the magnetic attraction between the magnet 42 and the insert 50. That is, the magnetic force between the magnet 42 and the insert 50 is such that rotation of the magnet 42 causes the insert 50, and thus the agitation ring 16, to rotate, while the agitation ring 16 floats on the water 46. The size of the magnet 42 may vary. For example, the magnet 42 may be sized to occupy a larger volume of the sealed interior chamber 22 as compared to that shown in FIG. 4.

Optionally, the water agitation system 10 may be configured to receive power from an electrical outlet. That is, the water agitation system 10 may not use batteries, but instead may receive power from a standard electrical outlet or power source. Also, the water agitation system 10 may be operatively connected to a solar cell, such that the water agitation system 10 is operated through solar power.

The water agitation system 10 may include a switch or timer, such as a photocell sensor, for selectively delivering power to the motor 26. The photocell sensor may be connected to the motor 26 for activating the motor 26 in the presence of light and deactivating the motor 26 in the absence of light. Alternatively, a switch (not shown) may be provided to allow the user to manually activate/deactivate the motor 26. As another alternative, a timer (not shown) may be provided to allow the user to set the time(s) during which the motor 26 is active and inactive. When a photocell is provided, it may also be desirable to provide a bypass mechanism for bypassing the photocell. Such a bypass mechanism may take the form of a switch (not shown). Alternatively, a wire within the housing may be moved between terminals to bypass the photocell.

Further, the motor 14 may be a servo motor configured to actuate the magnet assembly 28 in the directions of line B in addition to rotating the magnet assembly in the directions of A. The movement of the magnet assembly in the directions of line B causes a responsive movement of the agitation ring 16 in the directions of line B. In this way, the water agitation system 10 may provide wave motion to the water 46.

Figure 7:
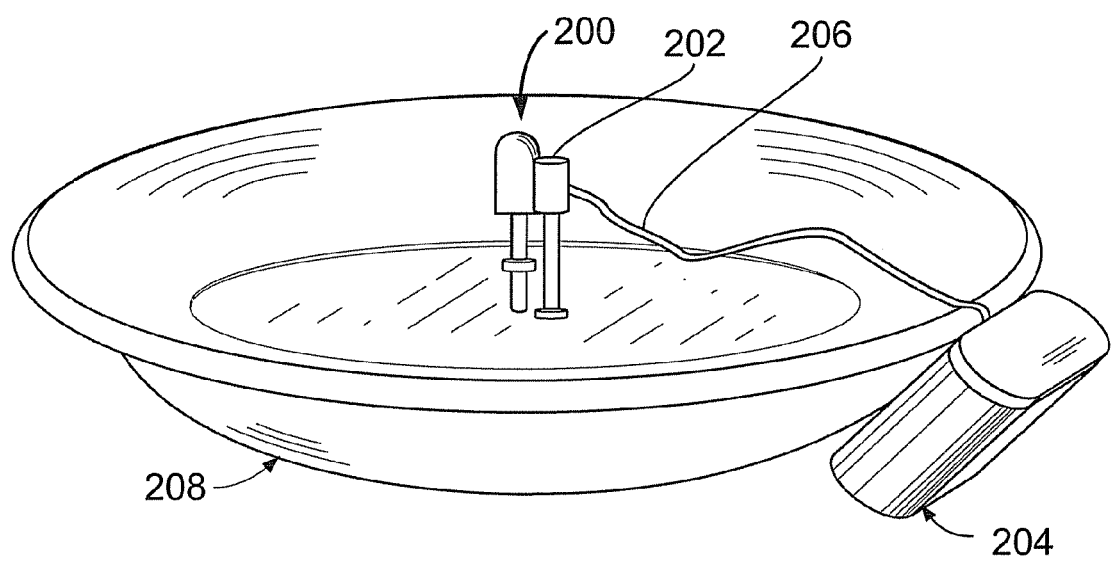
FIG. 7 illustrates an isometric view of a water agitation system according to another alternative embodiment of the present invention.

FIG. 7 illustrates an isometric view of a water agitation system 200 according to another alternative embodiment of the present invention. The water agitation system 200 includes a water agitation assembly 202 that is electrically connected to a remote power pack 204 through a water proof cable, or wire, 206. The water agitation assembly 202 is positioned within a water retention structure 208, such as a bird bath basin. The power pack 204 houses batteries, or may optionally provide an electrical connection between the water agitation assembly 202 and an electrical outlet. The water agitation assembly 202 houses a motor that operatively connects to an agitation mechanism (as described above). Because the power pack 204 is located remotely from the water agitation assembly 202, less space within the water retention structure is occupied by the water agitation assembly 202.

Thus, embodiments of the present invention provide an apparatus for imparting motion to water retained within water retaining structures, such as a bird bath. As discussed above, embodiments of the present invention may be used with various types of water retention structures, such as swimming pools, bird baths, ponds, and the like, in which water may stagnate. Embodiments of the present invention may be sized and shaped according to the size and shape of the water retention structure in which the water agitation system is used. The water agitation system may be battery powered, solar powered, or powered through a standard electrical outlet.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A water agitation system configured to be positioned within a water retention structure configured to receive and retain water, said system comprising:
   a main body positionable within a water retention area of the water retention structure, said main body comprising an upright tube;
   a magnet assembly and motor housed within said upright tube, said magnet assembly being operatively connected to said motor that is configured to rotate said magnet assembly; and
   an agitation ring loosely mounted over a portion of the main body, said agitation ring being magnetically attracted to, or repelled by, said magnet assembly so that a movement of said magnet assembly causes a responsive movement of said agitation ring in order to circulate water retained within the water retention structure when the water circulation system is positioned within the water retention structure.

2. The water agitation system of claim 1, wherein said agitation ring is buoyant and floats on water retained within said water retention structure.

3. The water agitation system of claim 1, wherein said agitation ring comprises at least one metal member that is magnetically attracted to, or repelled by, said magnet assembly.

4. The water agitation system of claim 1, wherein said agitation ring comprises at least one blade extending outwardly therefrom, wherein said at least one blade is configured to impart motion to water retained within the water retention structure.

5. The water agitation system of claim 1, wherein said motor is a servo motor that is configured to rotate said magnet assembly about a longitudinal axis of said magnet assembly, and to actuate said magnet assembly in a longitudinal direction of said main body.

6. The water agitation system of claim 1, wherein said water retention structure is a basin of a bird bath.

7. The water agitation system of claim 1, wherein said water retention structure is a livestock water trough.

8. The water agitation system of claim 1, wherein said water retention structure is one of a swimming pool, water tower, and pond.

9. The water agitation system of claim 1, wherein said motor is battery powered.

10. The water agitation system of claim 1, wherein said motor is electrically connectable to a standard electrical outlet.

11. The water agitation system of claim 1, further comprising a means for selectively activating and deactivating said motor.

12. The water agitation system of claim 11, wherein said means for selectively activating and deactivating said motor comprises one or more of a switch, timer and/or photocell.

13. A water agitation system positioned within a water retention structure that retains water, said system comprising:
   a main body within a water retention area of the water retention structure, said main body comprising an upright tube integrally formed with a base that is supported by the water retention structure;
   a magnet assembly and motor housed within said upright tube, said magnet assembly being operatively connected to said motor so that said motor actuates said magnet assembly;
   an agitation ring loosely mounted around a portion of said upright tube, said agitation ring being magnetically attracted to, or repelled by, said magnet assembly so that a movement of the magnet assembly causes said agitation ring to move in response to the movement of said magnet assembly, thereby agitating water retained within the water retention structure.

14. The water agitation system of claim 13, wherein said agitation ring is buoyant and floats on water retained within said water retention structure.

15. The water agitation system of claim 13, wherein said agitation ring comprises at least one metal foil member that is magnetically attracted to, or repelled by, said magnet assembly.

16. The water agitation system of claim 13, wherein said agitation ring comprises at least one blade extending outwardly therefrom, wherein said at least one blade is configured to impart motion to water retained within the water retention structure.

17. The water agitation system of claim 13, wherein said motor is a servo motor that is configured to rotate said magnet assembly about a longitudinal axis of said magnet assembly, and to actuate said magnet assembly in a longitudinal direction of said main body.

18. The water agitation system of claim 13, wherein said water retention structure is a basin of a bird bath.

19. The water agitation system of claim 13, wherein said water retention structure is a livestock water trough.

20. The water agitation system of claim 13, wherein said water retention structure is a swimming pool, water tower, or pond.

21. The water agitation system of claim 13, wherein said motor is battery powered.

22. The water agitation system of claim 13, wherein said motor is electrically connected to a standard electrical outlet.

23. The water agitation system of claim 13, further comprising one or more of a switch, timer and/or sensor for selectively activating and deactivating said motor.

* * * * *